United States Patent

[11] 3,601,452

[72] Inventor: Dietrich Brunner, Edingen, Germany
[21] Appl. No.: 843,691
[22] Filed: July 22, 1969
[45] Patented: Aug. 24, 1971
[73] Assignee: Teldix GmbH, Heidelberg, Germany
[32] Priority: July 27, 1968
[33] Germany
[31] P 17 80 058.7

[54] FLUID RETURN SYSTEM FOR ANTILOCKING VEHICLE BRAKES
3 Claims, 1 Drawing Fig.

[52] U.S. Cl. .................................................. 303/21 F, 188/181 A, 303/10, 303/61, 303/68, 417/298
[51] Int. Cl. ........................................................ B60t 8/12, B60t 13/14
[50] Field of Search........................................ 303/10, 61–63, 68–69, 21; 188/181; 417/298

[56] References Cited
UNITED STATES PATENTS
1,608,589  11/1926  Engstrom .................. 417/298 X
3,524,684  8/1970  Skoyles ...................... 303/21

Primary Examiner—Milton Buchler
Assistant Examiner—John J. McLaughlin
Attorney—Spencer & Kaye ABSTRACT: A reciprocating pump for returning brake fluid bled from the brake slave cylinder of a vehicle wheel during automatic, antilocking brake control is connected through a check valve to an expansible chamber accumulator receiving the fluid bled off. When the chamber is nearly empty a pin carried by the movable wall of the accumulator engages the check valve and holds it open so that the fluid is merely transferred back and forth between the pump and the accumulator to prevent the pump from running dry.

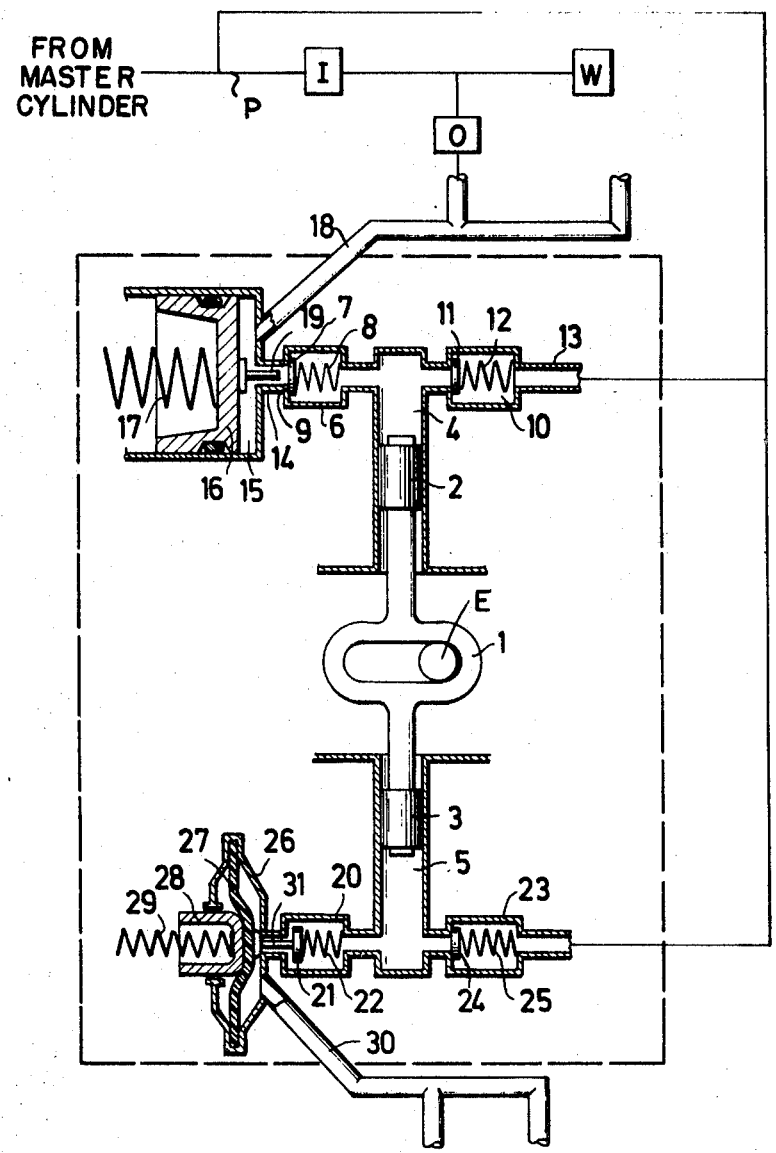

FLUID RETURN SYSTEM FOR ANTILOCKING VEHICLE BRAKES

BACKGROUND OF THE INVENTION

In antilocking control systems for fluid-pressure-actuated vehicle brakes employing a normally open inlet valve between the master cylinder and the wheel cylinder and a normally closed outlet valve for reducing the pressure at the wheel cylinder during those periods of the control cycle when the wheel-associated acceleration and deceleration sensor causes closing of the inlet valve and opening of the outlet valve, the brake fluid supply of the master cylinder may be diminished unless some means is provided for returning the brake fluid to the master cylinder. If the brake fluid between the master cylinder piston and the wheel cylinders of the vehicle brakes is depleted, the pedal "sinks" and may require "pumping" to maintain the brakes in operation. To overcome this problem, it has been proposed to provide a fluid-return circuit to limit depletion of the brake fluid between the master cylinder piston and the wheel cylinders, which fluid-return circuit includes a positive-displacement pump for recycling the brake fluid.

Certain problems, however, arise in conjunction with such fluid-return circuits. For example, the pump must be operated during brake application for a sufficient interval to insure that serious brake fluid depletion does not occur. As a consequence, there is every likelihood that the pump will then be operating when no or very little fluid is present to be returned and will consequently "run dry." This is true even if return-fluid reservoirs are used upstream of the pump inlet, given that, in any event, one is limited in the amount of fluid which may be held in reserve before depletion reaches serious proportions.

Stated another way, it has heretofore been practically impossible to coordinate the operation of the pump with the requirement for return of fluid. It is conceivable, of course, that such coordination could be accomplished by sufficiently complex and cumbersome control devices but, even if their cost and complexity could be tolerated, a malfunction might easily occur in the pump drive control such that it would remain in operation for such a length of time as to "run dry." A further difficulty resides in the fact that the pump might be cut off under full load, i.e. while acting against the full braking system pressure, resulting in high disconnection currents which must be safely dissipated.

The consequence of the pump running dry is that air may easily be introduced into the brake fluid system and, as is well known, the presence of air in the brake system results in a "spongy" pedal and, if present in sufficient amount, may require "pumping" of the brake pedal in order to operate the brakes.

SUMMARY OF THE INVENTION

The present invention relates to a brake-fluid-return system for an antilocking control system for vehicle brakes in which a reciprocating, positive displacement pump is connected through the medium of a unidirectional inlet valve means to an accumulator chamber which receives brake fluid bled from one or more wheel slave cylinders during normal operation of the control mechanism. The inlet valve means normally allows unidirectional flow from the accumulator to the pump and an outlet valve associated with the pump normally allows unidirectional flow from the pump back to the main pressure line of the brake fluid system thereby to limit depletion of the brake fluid from the main portion of the system during the control cycles.

The accumulator mechanism is so constructed as to cooperate with the inlet valve means to open the latter when the accumulator is nearly empty so as to allow brake fluid to pass back and forth from the accumulator to the pump so that, under these conditions, the pump may be operated indefinitely without running dry.

More specifically, the present invention utilizes a reservoir chamber defined in part by a movable wall normally spring-urged to decrease the chamber volume and wherein the movable wall carries a pin which engages the inlet valve means and holds it open when the chamber is nearly empty. However, the pin engages the inlet valve means to effect the disabling thereof before the volume of the reservoir chamber is at a value less than the displacement volume of the pump so that the system may operate indefinitely without the pump "running dry." Preferably, the pin is sufficiently long to maintain the inlet valve means open while the travel of the movable wall varies the reservoir volume by an amount at least equal to the volume swept by the piston of the associated pump.

The present invention thus assures, through the provision of simple structure, that the pump will be essentially empty, i.e. not under a pressure load, when it is set into operation and will thus always commence operation under the same conditions.

BRIEF DESCRIPTION OF THE DRAWING

The single FIGURE of the drawing illustrates a portion of an automatic antilocking control system for vehicle brakes provided with a preferred embodiment of the return pump system according to the invention.

DESCRIPTION OF THE PREFERRED EMBODIMENTS

As shown in the FIGURE, the brake-fluid-return system according to the present invention is associated with an antilocking control system for vehicle brakes of the type having a main pressure line P via which brake fluid under pressure from the master cylinder is applied through a normally open inlet valve I to a wheel slave cylinder W for operating the brakes of the associated wheel. A normally closed outlet valve O is actuatable by the associated automatic control system (not shown) to intermittently bleed off fluid, after the inlet valve I has been closed, to reduce the working pressure of the brake fluid at the slave cylinder W. Such a system is disclosed, for example, in copending U.S. application Ser. No. 771,079 filed by Heinz Leiber on Oct. 28, 1968, now U.S. Pat. No. 3,556,610.

The present invention concerns a mechanism for returning the brake fluid bled from the system back to the main pressure line P so that the brake fluid at the master cylinder will not be inordinantly depleted during the control operation to such an extent as to cause the brake pedal to "sink" or to otherwise deleteriously affect the system.

A conduit 18 receives the fluid bled off through the outlet valve O and directs it to an accumulator chamber 15. It will be appreciated that the other branch of the conduit 18 is connected to the normally closed outlet valve of another of the vehicle wheels so that the two branches of the conduit 18 service the left and right front wheels, for example, of the vehicle, whereas the conduit 30 has two branches servicing the left and right rear wheels, for example, of the vehicle. The complete system for only one of the vehicle wheels is shown for the purpose of simplicity.

The accumulator or reservoir shown in the upper portion of the drawing is composed of a cylinder having a piston 16 movable therewithin, the piston being normally urged by a spring 17 in a direction to reduce the volume of the chamber 15. The accumulator is connected through a conduit 14 to a check valve 6 having a valve member 7 urged by spring 8 into engagement with a seat 9 thereby to provide for unidirectional flow of brake fluid from the reservoir chamber 15 to the chamber 4 of the pump, spring 8 being weaker than spring 17. The pump is shown as including a yoke portion 1 having an opening receiving an eccentric drive pin E driven by any suitable source of power to move the pistons 2 and 3 of the pump reciprocatingly within their respective cylinders, as shown. The outlet for the pump chamber 4 is constituted by a check valve 10 having a valve member 11 urged by spring 12 normally against its seat to allow for only unidirectional flow of brake fluid from the pump chamber 4 back to the main pressure line P through the conduit 13.

Similarly, the lower portion of the drawing shows a reservoir chamber 26 having a movable wall diaphragm 27 normally urged by a plunger 28 and spring 29 in a direction to decrease the volume of the reservoir chamber. The reservoir chamber is connected by means of a check valve 20 with a pump chamber 5, the check valve including a valve member 21 normally urged by a spring 22 which is weaker than spring 29 against its seat to allow for unidirectional flow of brake fluid from the reservoir chamber to the pump chamber 5. Similarly, a check valve 23 connects the pump chamber 5 with the main pressure line P for unidirectional flow of brake fluid therethrough, the check valve including a valve member 24 normally urged by a spring 25 into engagement with its seat substantially as is shown.

The piston 16 and the diaphragm 27 carry, respectively, pins 19 and 31 which are adapted to engage against the respective valve members 7 and 21 to disable the inlet valve means to the respective pump chambers 4 and 5 under certain conditions which will hereinafter be described.

Ideally, the system for returning fluid to the main pressure line P would be such as to provide no net depletion of fluid under any conditions of operation of the automatic control system. However, such an arrangement places impractical demands upon the mechanism for sensing the need for operation of the return system and for control of the return system to replenish the main pressure line at the proper rate. If the pump is simply operated continuously during the control cycles such that any bled-off fluid will be returned promptly to the master cylinder main pressure line P, there is the constant danger that the pump will run dry and will, thus, draw air into the hydraulic fluid system with possible resultant disastrous consequences. By controlling the inlet check valve to the pump chamber as a function of residual accumulator chamber volume, it is assured, according to the present invention, that the pump will never run dry but will, however, always act to return the bled-off brake fluid back to the main pressure line P. Thus, even if the control for the drive of the pump malfunctions and the pump continues to run indefinitely, the pump will never run dry in a system according to the present invention.

In this regard, it will be appreciated that the length of the pins 19 and 31 are such that they will contact their respective valve members 7 and 21, to unseat them and allow the brake fluid to cycle back and forth between the reservoir chambers and the pump chambers, beginning at some time when the capacity of the reservoirs is greater than, or at least as great as, the pump chamber displacement. Thus, the pump will never run dry.

Specifically, the inlet valve means of the pumps will be disabled, i.e. maintained open, before the capacity of the associated reservoir chamber is reduced to a value less than the displacement of the corresponding pump piston and, of course, the value chosen should be just slightly greater than the pump displacement to minimize depletion of brake fluid in the main pressure line P. The eccentric drive E for the pump may be energized in different ways as, for example, in conjunction with the brake stop light switch or as a function of the volume of fluid bled into the reservoir chambers. It will be appreciated, of course, that the return springs 12 and 25 for the outlet check valves of the pumps will be sufficiently strong to resist the pressure in the reservoir chambers. Thus, when the inlet valves are disabled, as is shown for valve 21, the pump will merely cycle the fluid back and forth between the pump chamber 5 and the reservoir chamber.

The present invention, therefore, is well adapted to carry out the objects and attain the ends and advantages mentioned as well as others inherent therein. While the presently preferred embodiment of the invention is given for the purpose of disclosure, numerous changes in the details of construction and arrangement of parts may be made which will readily suggest themselves to those skilled in the art.

I claim:

1. In an antilocking control system for vehicle brakes of the type having a brake-fluid-pressure line leading to a wheel brake slave cylinder and including outlet valve means for intermittently bleeding off fluid selectively to reduce the pressure transmitted to the slave cylinder, the improvement comprising, in combination:

accumulator means connected for receiving fluid bled off by said outlet valve means and composed of a member having a movable wall and defining an expansible chamber therewith and spring means for urging said movable wall in the direction to reduce the volume of said chamber;

a positive displacement pump having an inlet connected to said accumulator means and an outlet connected to the pressure line;

pump inlet valve means connected to the inlet of said pump for normally allowing fluid to flow unidirectionally to said pump from said accumulator means; and means carried by said movable wall for retaining said inlet valve means in its open condition when said accumulator means approaches its empty condition for permitting fluid to be circulated indefinitely back and forth between said accumulator means and said pump.

2. An arrangement as defined in claim 1 wherein said means for retaining comprises a pin actuated by said accumulator means.

3. An arrangement as defined in claim 2 wherein said pin engages said inlet valve means at a time when the residual volume of said chamber is greater than the displacement volume of said pump.